Aug. 16, 1960     C. S. WILLIAMSON     2,948,986
BAIT HOLDER AND DISPENSER

Filed July 8, 1957     2 Sheets-Sheet 1

INVENTOR
C. S. WILLIAMSON

BY B. P. Fishburne, Jr.
ATTORNEY

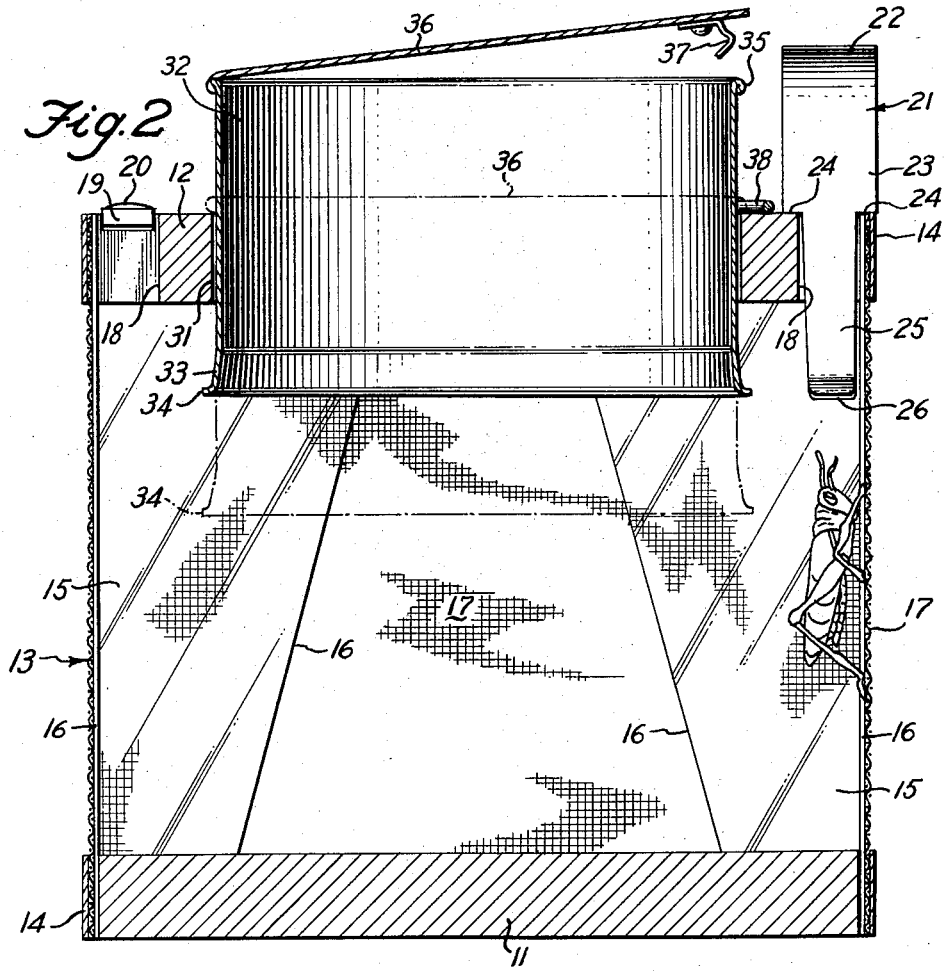
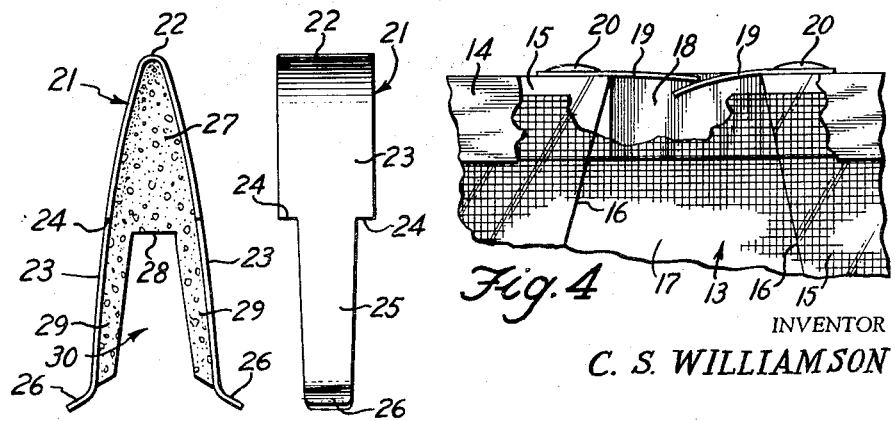

United States Patent Office 2,948,986
Patented Aug. 16, 1960

2,948,986

BAIT HOLDER AND DISPENSER

Carl S. Williamson, Seminole Ave., Orangeburg, S.C.

Filed July 8, 1957, Ser. No. 670,559

5 Claims. (Cl. 43—55)

The present invention relates to bait holders or dispensers.

A primary object of the invention is to provide a portable bait holder and dispenser for crickets or other similar crawling and climbing insect bait.

A further important object is to provide a device of the above-mentioned character having novel means for dispensing the crickets for use as bait one at a time, and without the necessity of handling the crickets with the fingers when removing them from the bait holder and applying them to the fish hook.

A further object of the invention is to provide a bait holder and dispenser of the above-mentioned character, constructed so that the crickets or like climbing insects are funneled or directed as they climb the side walls of the bait holder toward removable dispensing devices, with which the crickets are individually removed from the bait holder for application to the fish hook.

Still another object is to provide means for preventing the crickets from escaping from the bait holder or container during the dispensing operation or while the individual dispensing devices are removed from the bait holder.

A further object is to provide a bait holder of the above mentioned character which may be constructed from a wide variety of inexpensive and readily available materials, the bait holder being lightweight, sturdy and durable in construction, highly convenient to use, and readily portable.

Another object of the invention is to provide a bait holder and dispenser of the above-mentioned character having novel means to prevent the crickets from climbing the side walls of the bait holder except in the areas where the crickets will be funneled toward the dispensing devices.

A still further object of the invention is to provide means for dispensing the individual crickets from the bait holder without injuring or bruising them, such means also including sources of water or food for the crickets within the bait holder.

Other objects and advantages of the invention will become apparent during the course of the following description.

In the accompanying drawings, forming a part of this application, and in which like numerals are employed to designate like parts throughout the same, Figure 1 is a perspective view of a bait holder and dispenser in accordance with the invention.

Figure 2 is a central vertical section through the bait holder and dispenser showing one dispensing device removed.

Figure 4 is a similar view showing the dispensing device removed.

Figure 5 is a side elevation of one of the cricket dispensing devices.

Figure 6 is a further side elevation of the dispensing device taken at right angles to Figure 5.

Figure 1:
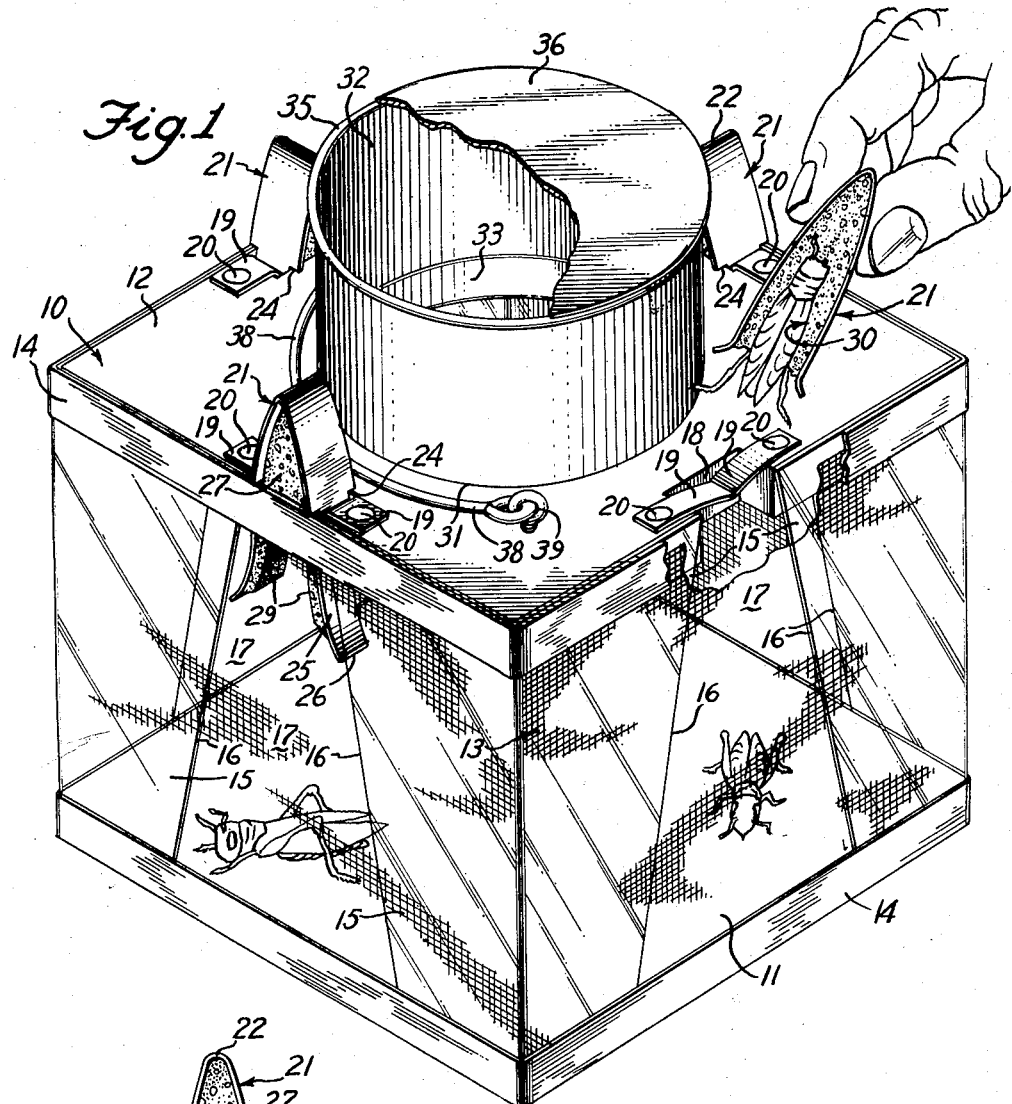

In the drawings, wherein for the purpose of illustration is shown a preferred embodiment of the invention, the numeral 10 designates generally a rectangular box-like body portion of the bait holding and dispensing device of the present invention. The box-like body portion 10 comprises a flat rectangular bottom wall 11 or floor, formed of any preferred material such as wood, plastics material, or the like. Spaced above the floor 11 in superposed relation therewith and preferably being of the same area as the floor 11 is a rectangular top wall 12, likewise formed of wood, plastics material, or any other desired material.

The rectangular side walls of the bait holder body portion may likewise be formed from a wide variety of materials, and if preferred, as shown in the drawings, the side walls may be constructed partially from a section or sections of relatively fine mesh screen, as indicated at 13, which screening may be metal screening, plastic screening or any other similar material. The side wall screening 13 extends about all four sides of the body portion 10, and for the entire height of the body portion, between the bottom face of the floor 11 and the top face of the upper wall 12. The side wall screening 13 may be secured to the margins of the walls 11 and 12 in any preferred manner, and the top and bottom edge portions of the side wall screening may have applied over them suitable marginal binding strips 14 of sheet metal, plastics material, or the like. The strips 14 are rigidly secured to the side wall screening 13 and the bottom and top walls 11 and 12 by any suitable means.

At the four corners of the body portion 10, and upon the inner face of the side wall screening 13 are mounted corner sections 15 of slick or smooth preferably stiff sheet material, such as smooth sheet plastics material, glass, smooth sheet metal or the like. The smooth sheet material 15 extends with the side wall screening 13 between the top and bottom walls 12 and 11, and about relatively broad corner portions of the rectangular body portion 10, as shown clearly in the drawings. The corner sheet sections 15 may also be secured in place by the marginal bands 14, as shown, or by any other suitable means preferred.

At each corner of the body portion 10, the sheet sections 15 may be formed from a single or unitary section of sheet material or from a pair of such sections, as preferred.

At each rectangular side wall of the body portion 10, the opposed edges 16 of adjacent sheet sections 15 are inclined somewhat from the vertical and converge upwardly between the bottom wall 11 and top wall 12, as shown. This construction defines upon the screening 13 of each side wall of the device a central upwardly tapering area 17, over which the crickets may readily crawl or climb toward the removable dispensing devices, to be described. It is only in the areas 17 of the side wall screening 13 which are left uncovered or exposed by the slick sheet sections 15 that the crickets will be able to crawl upwardly upon the side walls of the body portion 10. Due to the slickness or slipperiness of the sheet sections 15 at the corner portions of the bait holder, the crickets will be unable to crawl or climb thereover from the bottom to the top of the device.

Adjacent the top of each climbing area 17, the top wall 12 is provided in its adjacent marginal edge with a rectangular notch or cutout 18, as shown. The notches 18 are arranged at the longitudinal center of the adjacent edge of the top wall 12. A pair of flexible cover tabs 19 of rubber or rubber-like material are secured at 20 upon the top wall 12 at opposite sides of each notch 18. The flexible tabs 19 project over the notch 18 for covering the same, and preferably have their inner ends in somewhat overlapping relation as illustrated in Figure 4. The purpose of the tabs 19 is to prevent the escape of crickets from the bait holder during the time that the individual dispensing devices, to be described, are removed. The outer open sides of the notches 18 are fully covered by the side wall screening 13 of the climbing areas 17, since the screening extends to the top face of the upper wall 12, as stated.

Removably mounted within each notch 18 is a tweezer-like resilient individual cricket dispensing device 21, formed of resilient sheet plastic material, sheet metal or any other preferred material. Each dispensing device 21 comprises an upper bight portion 22, and a pair of downwardly diverging sides or legs 23, integral therewith. Near the longitudinal centers of the legs 23, the same are cut back or recessed upon opposite sides to form lateral shoulders 24 and lower leg portions 25 of reduced width. The bottom extremities 26 of the tweezer legs are directed outwardly in abrupt diverging relation for relatively short distances, as shown. When each dispensing device 21 is positioned upon the body portion 10 as shown in the drawings, the shoulders 24 engage the top wall 12 and the marginal band 14 to prevent the dispensing device from falling through the notch 18 and entering the interior of the body portion 10. Similarly, the purpose of the flared leg extensions 26 is to prevent the dispensing devices 21 from falling off of or separating from the body portion 10 should the latter become inverted at any time. If the device is inverted, and the dispensing tweezers 21 tend to shift outwardly from the wall 12, the flared extensions 26 will engage the underside of the wall 12 for preventing complete separation of the tweezers from the body portion 10, as should be obvious. When the dispensing or tweezer devices 21 are introduced into the notches 18, the flexible tabs 19 merely yield downwardly to permit passage of the tweezer devices, and the tabs 19 will then lie adjacent to the side walls of the notches 18 and between each side walls and the legs 23 of the tweezer devices.

Figure 3:
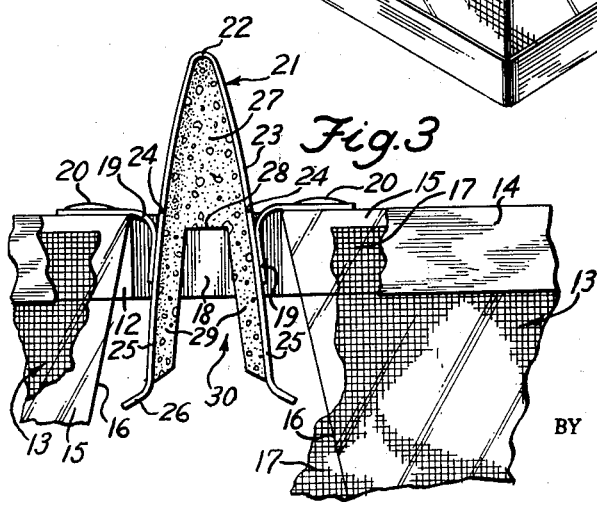
Figure 3 is a fragmentary side elevational view of the device adjacent one of the dispensing elements with parts broken away.

Each tweezer device 21 is preferably lined with an upper body portion 27 of sponge rubber or sponge rubber-like material, which is readily compressible and adapted to absorb and hold water, liquid cricket food or the like. The body portion of sponge material 27 may entirely fill the space between the legs 23 from approximately the position of the shoulders 24 to the upper bight portion 22 of the tweezer, as shown in Figure 5. Below the shoulders 24, the sponge material lining of the tweezer is cut or notched as at 28 to provide relatively narrow leg lining portions 29, which cover the reduced leg portions 25 of the tweezers, throughout their entire lengths down to the flared extensions 26. The sponge lining portions 29 form with the upper body portion 27 of sponge material a cricket receiving recess or opening 30 between the two leg portions 25 of each tweezer 21. As shown in Figures 3 and 5, the cricket receiving opening 30 of the tweezer 21 may taper somewhat upwardly toward the upper end 28 of the recess or opening. When each dispensing tweezer device 21 is in place within a notch 18, the downwardly opening cricket receiving recess 30 will be positioned centrally of one of the cricket climbing areas 17 of the screen side wall, and the outer side of the tweezer device 21 substantially contacts the screen side wall, as shown in Figure 2, so that the climbing cricket upon the adjacent area 17 must enter the recess or opening 30 of the tweezer.

The top wall 12 is provided with a large central opening 31, within which is mounted a cylindrical sleeve 32 of plastic material, sheet metal or the like. The sleeve 32 preferably has a snug fit within the opening 31, and may be made axially shiftable therein, if preferred. The lower portion of the side wall of the sleeve 32 may be flared somewhat at 33 for the purpose of forming a snug press fit within the opening 31 when the sleeve 32 is elevated. In Figure 2 of the drawings, the sleeve 32 is illustrated in an intermediate position, such as while being raised or lowered relative to the top wall 12. When the sleeve is fully elevated to the position shown in Figure 1, the flared portion 33 of the sleeve side wall will enter the opening 31 and become wedged therein so that the sleeve 32 will remain extended or elevated during the use of the device. It is also preferred to form upon the lower end of the sleeve 32 an outwardly directed narrow marginal flange 34 for the purpose of preventing any crickets from entering the bore of the sleeve 32 from the interior of the body portion 10. When the sleeve 32 is fully elevated, the flange 34 may contact or be spaced slightly below the bottom face of the wall 12. The upper end of the sleeve 32 is preferably formed with a marginal bead 35 to eliminate the possibility of the sleeve dropping bodily into the interior of the body portion 10. The top of the sleeve 32 is preferably provided with a hinged cover or lid 36, normally held closed by a friction catch 37. The cover 36 is a further means to prevent the escape of crickets from the body portion 10 of the bait holder. The opening 31 and sleeve 32 are of a sufficient diameter to readily permit the insertion of the hand through the sleeve to the interior or the body portion 10 to stir up or agitate the crickets so that they will crawl upwardly over the climbing areas 17 of the side walls toward the dispensing tweezers 21. When the device is not in use, as during transportation, the entire sleeve 32 may be shifted downwardly within the body portion 10 until the bead 35 engages the top wall 12. In this condition, the lid or cover 36 will be substantially flush with the upper face of the top wall 12.

For the purpose of carrying the device, there is preferably provided a carrying handle or bail 38, hingedly secured at 39 to the top wall 12, in surrounding relation to the elevatable sleeve 32. When the sleeve 32 is shifted downwardly or collapsed so as to be flush with the top wall 12, the handle 38 may be elevated for conveniently carrying the device. The carrying handle 38 may be omitted entirely, if preferred.

Also if preferred, the feature of adjustability of the sleeve 32 may be omitted entirely, and the sleeve may be formed so as to remain in the elevated or extended position of Figure 1 at all times, due to a tight press fit within the opening 31.

While I have shown and described the body portion 10 as being rectangular, the sleeve 32 as cylindrical, still it should be understood that these elements may be formed in any desired shape, for example, the body portion 10 may be formed cylindrical in shape if preferred, and the sleeve 32 may be rectangular or any other preferred shape. Likewise, I do not wish to limit the invention to any particular materials, and it should be understood that the entire device or its component parts may be formed of any suitable materials having the structural and physical properties which are suitable for making the particular parts in question.

For the purpose of illustration, there has been shown four of the cricket dispensing tweezers 21, and it should be understood that any desired number of tweezers and a corresponding number of climbing areas 17 may be used or provided in the device. Additionally, instead of the side wall screening 13 shown and described for the purpose of illustration, the side walls of the device may be formed entirely from smooth sheet plastics material or the like, with the upwardly tapering climbing areas 17 perforated or roughened in any preferred manner to allow the crickets to climb vertically in such areas only. The climbing areas 17 may likewise be formed of slatted material, corrugated material or material having an adhesive quality whereby the crickets may cling to it for climbing, whereas the corner areas of the side walls will always be formed with a smooth inner surface so that the crickets will only be able to climb in the climbing areas 17 of the side walls. In like manner, the side walls of the body portion 10 may be constructed so that the climbing areas 17 and the corner portions 15 are integral or formed of the same material, or if preferred, separate sections of material may be employed, as illustrated in the drawings.

It is also within the scope of the invention to provide anywhere within the body portion 10 a member or element upon which the crickets may climb vertically toward the cricket receiving opening 30 of a tweezer 21 mounted upon the top wall 12. In other words, in addition to the several tweezers 21 positioned near the side walls of the device, additional tweezers may be mounted within suitable openings formed within the top wall 12, inwardly of the side walls of the device, with suitable climbing members extending from the bottom wall 11 up to the tweezer openings 30 so that the crickets may readily enter the openings 30 for being dispensed.

In view of the foregoing detailed description, the use or operation of the device is substantially obvious. Briefly, however, the live crickets or similar insects to be used as bait are introduced into the body portion 10 through the sleeve 32. The tweezer devices 21 may have their sponge linings soaked or saturated with water or a solution of water with cricket food or a sweetening agent to attract the crickets. The tweezer devices are positioned upon the body portion 10, as shown in Figure 1, and the crickets will instinctively begin to crawl upwardly upon the side walls of the body portion. The slick surfaces of the corner sheet sections 15 will render it impossible for the crickets to crawl upwardly at the corners of the body portion, but in the areas 17 which are formed entirely of screening or other perforated or roughened material, the crickets may readily crawl upwardly toward the openings 30 in the lower ends of the tweezers 21. In practice, I have found that with a substantial number of crickets within the body portion 10, there will always be one or more crickets in position to be dispensed by means of the tweezers 21. To dispense a cricket, it is merely necessary to grasp one of the tweezers 21 with the fingers, as illustrated in Figure 1, and squeeze lightly upon the legs 23 of the tweezer for compressing the cricket between the pad portions 29, whereupon the tweezer and cricket may be readily withdrawn from the body portion 10 and the tabs 19 will assume the covering or closing positions over the particular notch 18 so that additional crickets cannot escape from the device. The tweezer 21 will not damage or bruise the live cricket, and the same may be applied directly to a fish hook for use as bait without handling the cricket with the fingers. This is advantageous since there is always the possibility of injuring the fingers with the fish hook where the bait must be handled directly with the fingers. In other words, the tweezer 21 serves the dual purpose of dispensing the individual crickets from the device and also forms an implement for applying them directly to the fish hook.

In the event that the crickets are sluggish or fail to climb the side wall portions 17 in sufficient members, it is merely necessary to open the cover 36 and insert the hand or a stick into the body portion 10 to agitate or stir up the crickets, whereupon they will readily begin to climb the side walls and enter the openings 30 of the tweezers in position for dispensing.

It is thus seen that I have provided a convenient device for holding or carrying the crickets and for dispensing them individually for use as bait without damaging the crickets and without liability of injuring the hands or fingers. Also, the device serves as a feeding device or watering device for the crickets so that the same will remain alive and healthy for a longer period of time. The device is simplified and compact in construction, and with a minimum of care should have a long and useful life for the fisherman.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A bait carrying and dispensing device comprising a receptacle body portion adapted to contain bait, said body portion including side wall means upwardly tapering areas constructed so that the bait may readily climb thereon and slick areas on opposite sides of said tapering areas upon which the bait cannot climb, said body portion having a top wall provided with openings adjacent to the climbing areas of the side walls, and removable dispensing tweezers positioned within said openings and having sides between which the bait may climb into position for being individually dispensed by said tweezers.

2. A bait carrying and dispensing device comprising a receptacle body portion adapted to contain the bait, said body portion including upstanding side wall means having areas upon which the bait may readily climb and slick areas upon opposite sides of the bait climbing areas and upon which the bait cannot climb, said body portion including a top wall provided with openings adjacent to the insect climbing areas, removable dispensing tweezers arranged within said openings and having sides between which the bait may climb into position within said tweezers, and a lining of compressible absorbent material for each tweezer device adapted to hold water or the like to attract the insect.

3. A bait carrying and dispensing device comprising a receptacle body portion adapted to contain the bait, said body portion including upstanding side wall means having areas upon which the bait may readily climb and slick areas upon opposite sides of the bait climbing areas and upon which the bait cannot climb, said body portion including a top wall provided with openings adjacent to the insect climbing areas, removable dispensing tweezers arranged within said openings and having sides between which the bait may climb into position within said tweezers, a lning of compressible absorbent material for each tweezer device adapted to hold water or the like to attract the insect, and flexible closure flap means adjacent to said openings and automatically covering said openings when the tweezers are removed from the openings to prevent the escape of the bait from said body portion, the closure flap means yielding to permit the insertion of the tweezers within said openings.

4. A bait carrying and dispensing device comprising a receptacle body portion which is upstanding in use, said receptacle body portion including generally vertical side wall means and a bottom and a top, said side wall means having a generally vertical area extending substantially from said bottom to said top and also so constructed that the bait may climb thereon, said side wall means having smooth areas upon opposite sides of the bait climbing area, said top having an opening arranged adjacent to the upper end of the bait climbing area, a removable dispensing tweezer arranged within said opening and including spaced arms, and a compressible liquid absorbent element arranged between said arms and forming a recess between the arms.

5. A bait carrying and dispensing device comprising a receptacle body portion adapted to contain the bait, said body portion including upstanding side wall means having areas upon which the bait may readily climb and slick areas upon opposite sides of the bait climbing areas, said body portion including a top wall provided with openings arranged adjacent to the insect climbing areas, removable dispensing tweezers, each tweezer including spaced sides having free ends, said sides forming a recess between them, the tweezers corresponding in number and arrangement to said openings and the free ends of the tweezers facing downwardly when the tweezers are inserted within said openings, means to limit the downward movement of the tweezers when inserted into said openings, and a lining of compressible material arranged within the recess of each tweezer, said lining having a recess to receive the insect travelling upon the adjacent climbing area.

References Cited in the file of this patent

UNITED STATES PATENTS

| | | |
|---|---|---|
| 1,638,222 | Spring | Aug. 9, 1927 |
| 2,259,814 | Green et al. | Oct. 21, 1941 |
| 2,346,744 | Glassman | Apr. 18, 1944 |
| 2,538,853 | Worl | Jan. 23, 1951 |
| 2,718,089 | Heaton | Sept. 20, 1955 |
| 2,786,297 | Simmons | Mar. 26, 1957 |
| 2,846,807 | Tucker | Aug. 12, 1958 |

OTHER REFERENCES

Popular Mechanics Magazine, April 1954, page 113, vol. 101, No. 4.